(12) United States Patent
Matlack et al.

(10) Patent No.: US 10,940,656 B2
(45) Date of Patent: Mar. 9, 2021

(54) PRESS ASSEMBLY HAVING A PRESS TOOL

(71) Applicant: THE BOEING COMPANY, Chicago, IL (US)

(72) Inventors: Michael Palmore Matlack, Saint Charles, MO (US); Steven Michael Shewchuk, Saint Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 718 days.

(21) Appl. No.: 15/609,750

(22) Filed: May 31, 2017

(65) Prior Publication Data

US 2018/0345616 A1 Dec. 6, 2018

(51) Int. Cl.
| | |
|---|---|
| *B30B 15/06* | (2006.01) |
| *B29C 33/00* | (2006.01) |
| *B29C 43/36* | (2006.01) |
| *B29C 43/32* | (2006.01) |
| *B30B 7/02* | (2006.01) |
| *B30B 15/04* | (2006.01) |

(Continued)

(52) U.S. Cl.
CPC ........ *B30B 15/062* (2013.01); *B29C 33/0011* (2013.01); *B29C 33/307* (2013.01); *B29C 43/32* (2013.01); *B29C 43/36* (2013.01); *B30B 7/026* (2013.01); *B30B 15/04* (2013.01); *B30B 15/041* (2013.01); *B30B 15/061* (2013.01); *B30B 15/064* (2013.01); *B33Y 80/00* (2014.12); *B29C 33/3842* (2013.01); *B29C 2043/3205* (2013.01); *B29C 2043/366* (2013.01); *B29C 2043/3615* (2013.01); *B29K 2901/00* (2013.01); *B29L 2031/757* (2013.01)

(58) Field of Classification Search
CPC ............ B30B 7/026; B29C 2043/3615; B29C 2043/3205; B29C 43/32; B29C 2043/366
See application file for complete search history.

(56) References Cited

U.S. PATENT DOCUMENTS

| | | | |
|---|---|---|---|
| 7,610,790 | B2 | 11/2009 | Halford |
| 7,703,190 | B2 | 4/2010 | Halford |

(Continued)

FOREIGN PATENT DOCUMENTS

| | | |
|---|---|---|
| EP | 3102391 B1 | 12/2016 |
| JP | H08192467 A | 7/1996 |

OTHER PUBLICATIONS

Extended European Search Report for Corresponding EP Application No. 18170426.3-1014 dated Sep. 27, 2018 (86 pages).

*Primary Examiner* — Timothy Kennedy
*Assistant Examiner* — George W. Brady
(74) *Attorney, Agent, or Firm* — The Small Patent Law Group LLC; Jay J. Hoette

(57) ABSTRACT

A press tool for a press assembly includes an additive manufactured body including a plurality of stacked layers of additive manufacturable material extending between an interior side and an exterior side. The interior side has a part forming surface including a surface profile for forming a part. The exterior side has a plurality of hollow cores defined by longitudinal walls and lateral walls meeting at joints. Press inserts are coupled to the longitudinal walls and the lateral walls at the exterior side. The press inserts are configured to be pressed inward by a pressing load during a pressing operation for forming the part. The press inserts distribute the pressing load along the longitudinal and lateral walls.

25 Claims, 6 Drawing Sheets

(51) Int. Cl.
  *B33Y 80/00* (2015.01)
  *B29C 33/30* (2006.01)
  *B29L 31/00* (2006.01)
  *B29C 33/38* (2006.01)

(56) References Cited

U.S. PATENT DOCUMENTS

| | | |
|---|---|---|
| 7,726,167 B2 | 6/2010 | Halford |
| 7,901,166 B2 | 3/2011 | Halford |
| 8,128,077 B2 | 3/2012 | Halford |
| 8,469,344 B2 | 6/2013 | Halford |
| 8,474,124 B2 | 7/2013 | Halford |
| 9,034,234 B2 | 5/2015 | Halford |
| 9,370,877 B2 | 6/2016 | Halford |
| 9,610,709 B2 | 4/2017 | Halford |
| 2003/0011106 A1 | 1/2003 | Osaki |
| 2008/0134464 A1 | 6/2008 | Salice |
| 2011/0156304 A1 | 6/2011 | Walker et al. |
| 2012/0114812 A1* | 5/2012 | Lawrence ............... G06T 7/97 426/231 |
| 2012/0135197 A1 | 5/2012 | Halford |
| 2013/0220521 A1* | 8/2013 | Senibi ............... B29C 70/382 156/173 |
| 2014/0306377 A1 | 10/2014 | Halford |
| 2014/0326035 A1 | 11/2014 | Halford |
| 2014/0360653 A1 | 12/2014 | Halford |
| 2014/0367889 A1 | 12/2014 | Halford |
| 2015/0048551 A1 | 2/2015 | Halford |
| 2015/0190947 A1 | 7/2015 | Halford |
| 2016/0001481 A1 | 1/2016 | Halford |
| 2016/0016335 A1 | 1/2016 | Halford |
| 2016/0031122 A1 | 2/2016 | Halford |
| 2016/0167255 A1 | 6/2016 | Halford |
| 2016/0207239 A1 | 7/2016 | Halford |
| 2016/0250778 A1* | 9/2016 | Halla ............... B29C 33/02 264/219 |

* cited by examiner

PRESS ASSEMBLY HAVING A PRESS TOOL

BACKGROUND OF THE INVENTION

The subject matter herein relates generally to a press assembly having a press tool for forming a part.

Press tools are typically used in part-forming machines where the press tools are pressed together to form the part therebetween during a molding process. For example, press tools are used in resin infusion molding processes, thermoset molding processes, thermoplastic molding processes, or other molding processes. Conventional press tools are manufactured from metal blocks having profiled surfaces formed therein to define the part forming surface. However, manufacture of the press tools is expensive due to the high cost of the material and the forming process, such as a grinding or milling process to remove parts of the metal block to form the profiled surface. Additionally, the metal press tools are heavy. Some conventional press tools form a honeycomb or hollowed out structure on the back side of the metal press tool to reduce the weight and allow heating and cooling of the press tool, but the process of forming the hollowed out side adds manufacturing costs.

Recently, additive manufactured tools have been developed for forming tools using an additive manufacturing process. The tools may be manufactured more cost effectively than metal tools to reduce tooling costs. However, additive manufactured tools are not without disadvantages. For instance, the additive manufactured tools typically have weak through-thickness properties and thus have problems with deformation when subjected to large pressing loads. As a result, the tools are bulked up by providing more material and thicker structures, increasing the weight and cost of manufacture of the tool. Another problem with additive manufactured tools is that the material used for such tools typically have low thermal conductivity and poor high temperature tolerances. The tools become weaker at high temperatures, such as in part-forming machines that provide heating for forming the part. The heating supplied by the machine is poorly conducted to the part through the additive manufactured tool.

BRIEF DESCRIPTION OF THE INVENTION

In one embodiment, a press tool is provided including an additive manufactured body including a plurality of stacked layers of additive manufacturable material extending between an interior side and an exterior side. The interior side has a part forming surface including a surface profile for forming a part. The exterior side has a plurality of hollow cores defined by longitudinal walls and lateral walls meeting at joints. Press inserts are coupled to the longitudinal walls and the lateral walls at the exterior side. The press inserts are configured to be pressed inward by a pressing load during a pressing operation for forming the part. The press inserts distribute the pressing load along the longitudinal and lateral walls.

In another embodiment, a press assembly is provided including a frame including a press surface for generating a pressing load and a thermal unit for generating a thermal load configured for at least one of heating or cooling. A press tool is coupled to the frame and engages the press surface. The press tool has an additive manufactured body including a plurality of stacked layers of additive manufacturable material extending between an interior side and an exterior side. The interior side has a part forming surface including a surface profile for forming a part. The exterior side has a plurality of hollow cores defined by longitudinal walls and lateral walls meeting at joints. The hollow cores are in thermal communication with the thermal unit for receiving the thermal load. The press tool has press inserts coupled to the longitudinal walls and the lateral walls at the exterior side. The press inserts have abutment surfaces engaging the press surface of the frame that are pressed inward by the pressing load from the frame during a pressing operation for forming the part. The press inserts distribute the pressing load along the longitudinal and lateral walls.

In a further embodiment, a method of forming a part is provided including providing a press tool having an additive manufactured body including a plurality of layers extending between an interior side having a part forming surface including a surface profile for forming the part and an exterior side having a plurality of hollow cores defined by longitudinal walls and lateral walls meeting at joints. The method includes coupling one or more press inserts to the longitudinal walls and the lateral walls at the exterior side, loading the press tool with the press inserts into a frame of a press assembly, and pressing the frame inward during a pressing operation to impart a pressing load against the press inserts. The press inserts distribute the pressing load along the longitudinal and lateral walls to form the part against the surface profile.

DETAILED DESCRIPTION OF THE INVENTION

The embodiments described herein provide a press tool for a press assembly of a part-forming machine. The herein-described press tool may be manufactured cost effectively and have sufficient mechanical and thermal properties for press-forming parts.

Figure 1:
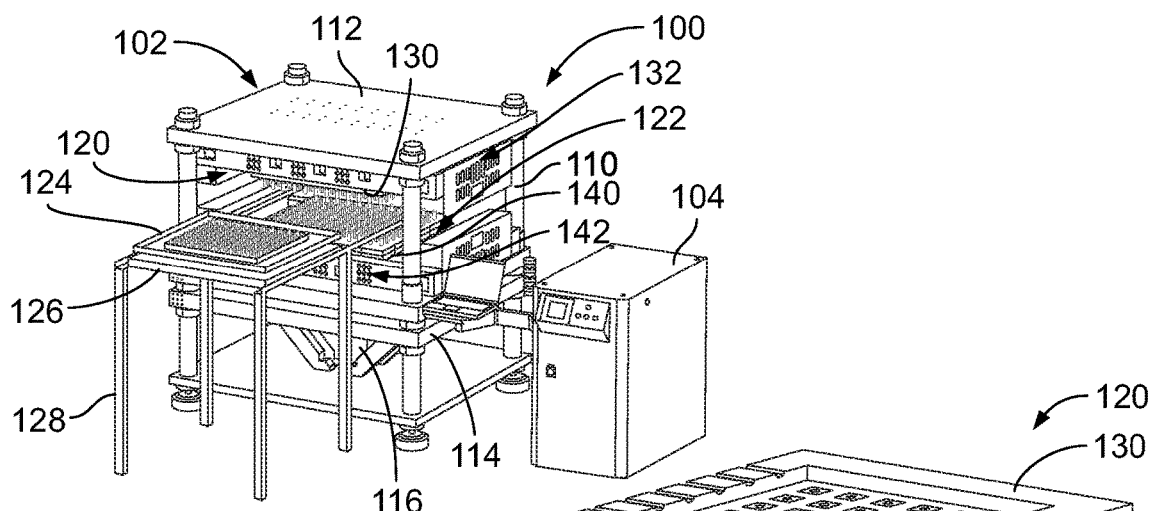
FIG. 1 is illustrates a forming machine including a press assembly in accordance with an exemplary embodiment.

FIG. 1 illustrates a forming machine 100 including a press assembly 102 in accordance with an exemplary embodiment. The forming machine 100 is used to form a part during a pressing operation. The forming machine 100 forms the part using pressure and temperature control during the forming process. Various types of parts may be manufactured using the forming machine 100. For example, in various embodiments, the forming machine 100 may be used to manufacture parts for an aircraft; however, other types of parts may be manufactured in alternative embodiments. In various embodiments, the manufactured part may be a molded part molded by the forming machine 100, such as using a resin infusion molding process, a thermoset molding process, a thermoplastic molding process, or another molding process.

The forming machine 100 includes a controller 104 operably coupled to the press assembly 102 for controlling the pressing operation. For example, the controller 104 may control opening and closing of the press assembly 102, heating or cooling of the press assembly 102, injection of material, such as resin, into the press assembly 102, and the like.

In an exemplary embodiment, the press assembly 102 includes a frame 110 having an upper plate 112 and a lower plate 114 supported by frame elements. The press assembly 102 includes one or more pressing devices 116 used to apply pressure during the forming process. In the illustrated embodiment, the press assembly 102 includes an upper press assembly 120 coupled to the upper plate 112 and a lower press assembly 122 coupled to the lower plate 114. The upper press assembly 120 and the lower press assembly 122 may be referred to hereinafter singularly as simply a "press assembly" and may be referred to hereinafter collectively as "press assemblies".

In the illustrated embodiment, the upper press assembly 120 is fixed to the upper plate 112 while the lower press assembly 122 is movable relative to the lower plate 114 by the pressing device 116 below the lower plate 114. In other various embodiments, the upper press assembly 120 may be movable and/or the lower press assembly 122 may be fixed. The press assemblies 120, 122 are opened to allow insertion and removal of press tools 124, 126 used for forming the part and/or insertion of materials for forming the part, such as a thermoset preform between the press tools 124, 126, and/or removal of the formed part.

In an exemplary embodiment, the press assembly 102 includes a rack 128 for loading and unloading the press tools 124, 126 into the pressing zone or out of the pressing zone. The rack 128 may be used to align the press tools 124, 126 in the press assemblies 120, 122. Having the press tools 124, 126 removable from the press assemblies 120, 122 allows for quick change out of the press tools 124, 126 with press tools 124, 126 used to form a different part, such as a part having a different shape. As such, the forming machine 100 may be used to form various types of parts by interchanging press tools 124, 126.

In an exemplary embodiment, the upper press assembly 120 includes the upper press tool 124, an upper frame 130 for supporting and pressing against the upper press tool 124, and an upper thermal unit 132 for heating and/or cooling the upper press tool 124. The upper frame 130 is configured to be supported by the upper plate 112. The upper thermal unit 132 is operably coupled to the controller 104.

In an exemplary embodiment, the lower press assembly 122 includes the lower press tool 126, a lower frame 140 for supporting and pressing against the lower press tool 126, and a lower thermal unit 142 for heating and/or cooling the lower press tool 126. The lower frame 140 is configured to be supported by the lower plate 114. In an exemplary embodiment, the lower frame 140 is movable by the pressing device 116 relative to the lower plate 114 during the pressing operation. The lower frame 140 moves the lower press tool 126 toward the upper press tool 124 during the pressing operation. The lower thermal unit 142 is operably coupled to the controller 104.

Figure 2:
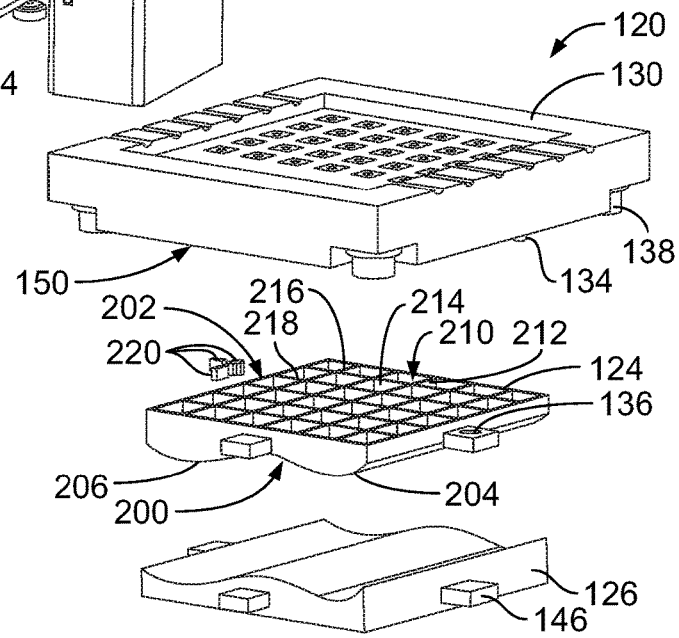
FIG. 2 is an exploded view of a portion of the press assembly showing an upper press assembly and a lower press assembly.
Figure 3:
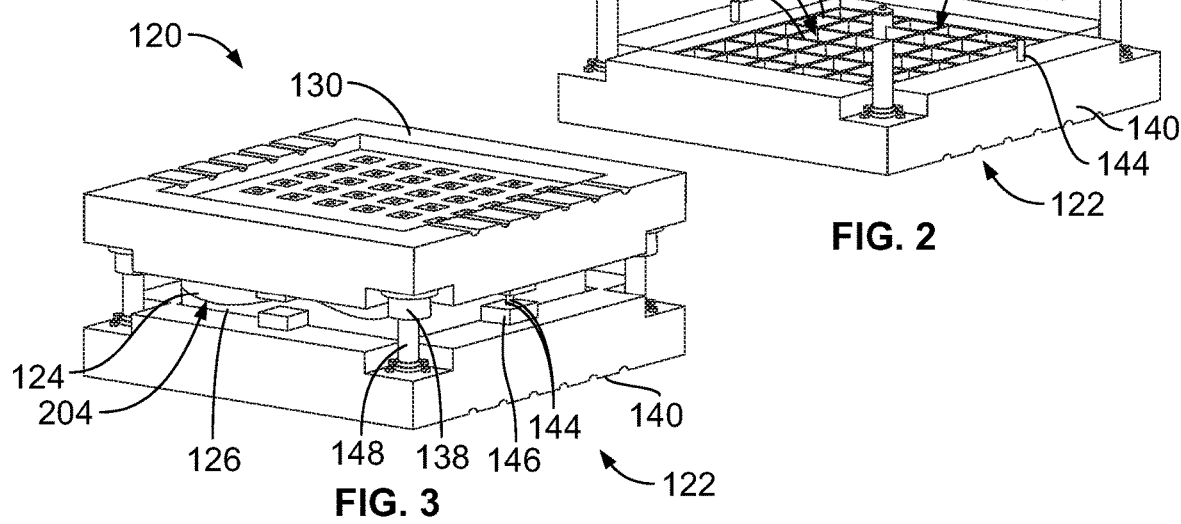
FIG. 3 is an assembled view of a portion of the press assembly showing the upper press assembly coupled to the lower press assembly.

FIG. 2 is an exploded view of a portion of the press assembly 102 showing the upper press assembly 120 and the lower press assembly 122. FIG. 3 is an assembled view of a portion of the press assembly 102 showing the upper press assembly 120 coupled to the lower press assembly 122. The upper press tool 124 is configured to be coupled to the upper frame 130. The lower press tool 126 is configured to be coupled to the lower frame 140. The part is configured to be formed in the part forming space defined between the upper press tool 124 and the lower press tool 126.

The upper frame 130 includes a locating element 134 and the upper press tool 124 includes a locating element 136. The locating elements 134, 136 interact to align the upper press tool 124 with the upper frame 130. In the illustrated embodiment, the locating element 134 is a post and the locating element 136 is an opening that receives the post; however, other types of locating elements 134, 136 may be used in alternative embodiments. The upper frame 130 includes one or more guide elements 138 to guide mating with the lower press assembly 122.

The lower frame 140 includes a locating element 144 and the lower press tool 126 includes a locating element 146. The locating elements 144, 146 interact to align the lower press tool 126 with the lower frame 140. In the illustrated embodiment, the locating element 144 is a post and the locating element 146 is an opening that receives the post; however, other types of locating elements 134, 136 may be used in alternative embodiments. The lower frame 140 includes one or more guide elements 148 to guide mating with the upper press assembly 120. For example, in the illustrated embodiment, the guide elements 148 are posts and the guide elements 138 are openings that receive the posts. Other types of guide elements 138, 148 may be used in alternative embodiments.

The frame 130 of the upper press assembly 120 includes a press surface 150 at the bottom for generating a pressing load against the upper press tool 124. The frame 130 may be similar in structure to the frame 140. In an exemplary embodiment, the frame 130 includes hollow cores (shown in phantom) separated by separating walls (shown in phantom) extending vertically through the frame 130. The hollow cores may form part of the upper thermal unit 132 to provide heating and/or cooling for the upper press tool 124. For example, hot air (or cold air) may be delivered to and/or generated in the cores. The separating walls separate the cores to allow different portions of the upper frame 130 to be at different temperatures, such as for heating and/or cooling portions of the upper press tool 124 differently.

The frame 140 of the lower press assembly 122 includes a press surface 160 at the top for generating a pressing load against the lower press tool 126. In an exemplary embodiment, the frame 140 includes hollow cores 162 separated by separating walls 164 extending vertically through the frame 140. The hollow cores 162 may form part of the lower thermal unit 142 to provide heating and/or cooling for the lower press tool 126. For example, hot air (or cold air) may be delivered to and/or generated in the cores 162. The separating walls 164 separate the cores 162 to allow different portions of the lower frame 140 to be at different temperatures, such as for heating and/or cooling portions of the lower press tool 126 differently. The separating walls 164 form a pixelated grid or array of the cores 162 for the lower thermal unit 142. The edges of the separating walls 164, at the top, define the press surface 160 configured to press against the lower press tool 126.

The upper press tool 124 may be similar in structure to the lower press tool 126 and elements and description relating to the upper press tool 124 and/or the lower press tool 126 may be equally applicable to the other press tool 124, 126. The upper press tool 124 extends between an interior side 200 and an exterior side 202. The interior side 200 faces the lower press tool 126. The exterior side 202 faces the upper frame 130. The interior side 200 includes a forming wall 206 defining a part forming surface 204 having a surface profile for forming the part. The part forming surface 204 may cover the entire interior side 200. Alternatively, the part forming surface 204 may be defined along only a portion of the interior side 200, such as near a center of the interior side 200. The size and shape of the part forming surface 204 corresponds with the desired size and shape of the part. In an exemplary embodiment, the part forming surface 204 is nonplanar. For example, the part forming surface 204 may be contoured, such as to define the shape of the part. Optionally, the interior side 200 may include one or more seals for sealing against the part and/or the lower press tool 126. Optionally, the interior side 200 may include one or more ports, such as for injecting material into the space between the press tools 124, 126 for forming the part. For example, resin may be injected onto the part forming surface 204. In other various embodiments, the material used for forming the part may be injected onto the part forming surface 204, such as after the press tools 124, 126 are pressed together.

The upper press tool 124 includes a plurality of hollow cores 210 at the exterior side 202. The hollow cores 210 are defined by longitudinal walls 212 and lateral walls 214 meeting at joints 216. In an exemplary embodiment, the longitudinal walls 212 and the lateral walls 214 are perpendicular to each other such that the joints 216 are right angle joints. The longitudinal walls 212 and lateral walls 214 may extend generally vertically between the interior side 200 and the exterior side 202. The longitudinal walls 212 and the lateral walls 214 extend between the forming wall 206 at the bottom and exterior edges 218 at the top.

In an exemplary embodiment, the upper press tool 124 includes one or more press inserts 220 (examples of which are shown in FIG. 2 uncoupled from the walls 212, 214) configured to be coupled to the longitudinal walls 212 and the lateral walls 214 at the exterior side 202. The press inserts 220 are configured to be pressed inward by the pressing load from the upper frame 130 during the pressing operation for forming the part. For example, the upper frame 130 may be pressed against the press inserts 220 rather than directly against the longitudinal walls 212 and the lateral walls 214. The press inserts 220 distribute the pressing load along the longitudinal walls 212 and the lateral walls 214.

In use, the press tools 124, 126 are positioned between the frames 130, 140. The press tools 124, 126 are aligned by the locating elements 134, 136, 144, 146 and by the guide elements 138, 148. During the pressing operation, the lower frame 140 and/or the upper frame 130 are driven toward one another to press the part between the press tools 124, 126. The part forming surface 204 forms the part. Once the part is formed, the press assemblies 120, 122 may be opened to release the part.

Figure 4:
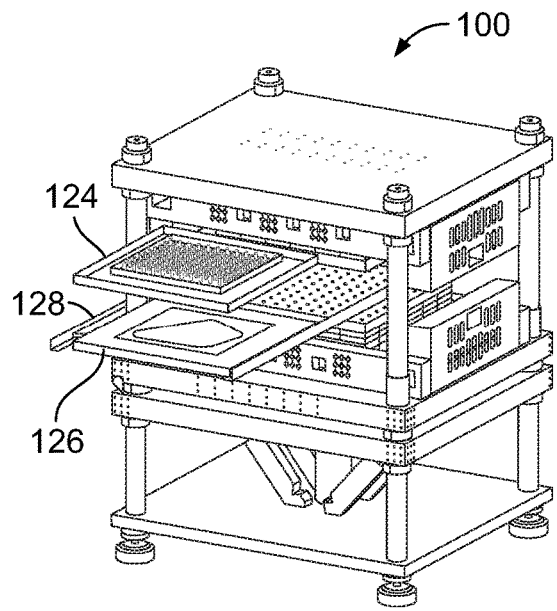
FIG. 4 illustrates the forming machine showing press tools in accordance with an exemplary embodiment.

FIG. 4 illustrates the forming machine 100 showing the press tools 124, 126 being loaded into the rack 128. Material for forming the part is located between the press tools 124, 126, such as on the upper surface of the press tool 126.

Figure 5:
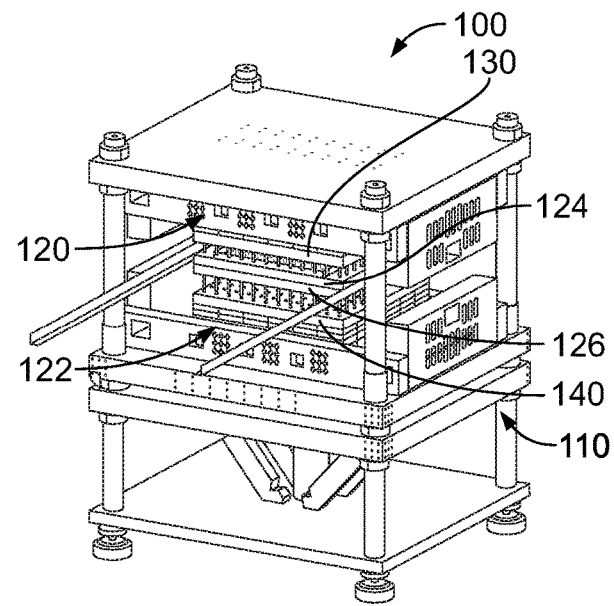
FIG. 5 illustrates the forming machine showing the press tools between an upper frame and a lower frame.

FIG. 5 illustrates the forming machine 100 showing the press tools 124, 126 loaded into the frame 110 between the upper frame 130 and the lower frame 140. The press assemblies 120, 122 are open to allow the press tools 124, 126 to be loaded into position. The upper press tool 124 may be coupled to the upper frame 130 and/or the lower press tool 126 may be coupled to the lower frame 140.

Figure 6:
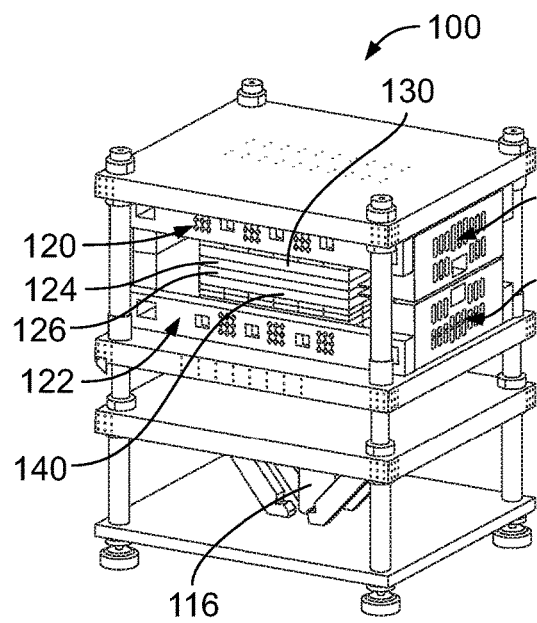
FIG. 6 illustrates the forming machine showing the press assemblies in closed positions.

FIG. 6 illustrates the forming machine 100 showing the press assemblies 120, 122 in closed positions. For example, the pressing device 116 presses the lower plate 114 in an upward direction to close the lower press assembly 122 against the upper press assembly 120. The lower press tool 126 is pressed against the upper press tool 124 to form the part therebetween. The thermal units 132, 142 may be operated to heat the material of the part during the forming process and/or cool the material of the part during the forming process. For example, the thermal units 132, 142 may heat the material of the part to promote forming and may cool the material of the part to promote curing. The pixelated hollow cores of the frames 130, 140 and the press tools 124, 126 may allow targeted heating and/or cooling of different portions of the part during the forming process. For example, different portions of the part may be heated and/or cooled at different temperatures, at different rates, and the like.

Figure 7:
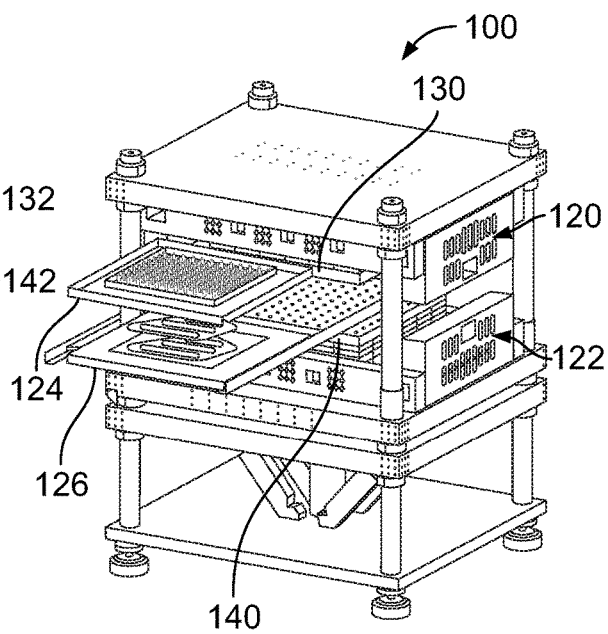
FIG. 7 illustrates the forming machine showing the press assemblies in open positions to allow the press tools to be removed from the frames.

FIG. 7 illustrates the forming machine 100 showing the press assemblies 120, 122 in open positions to allow the press tools 124, 126 to be removed from the frames 130, 140. When the press tools 124, 126 are removed, the part may be removed. New material may be positioned between the press tools 124, 126 to form another part. Alternatively, the press tools 124, 126 may be removed and replaced with different press tools for forming a different part.

Figure 8:
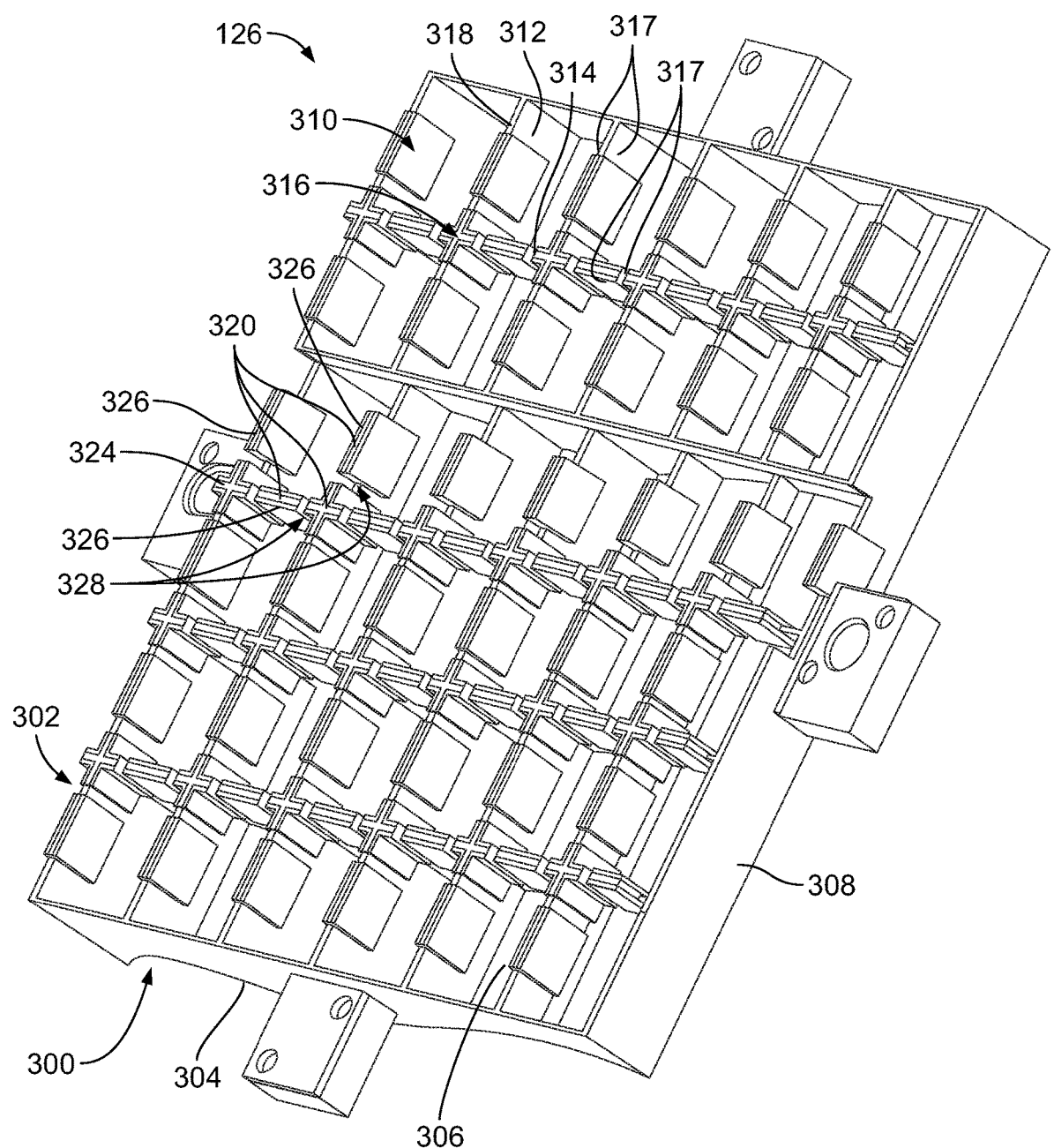
FIG. 8 is a bottom perspective view of the press tool in accordance with an exemplary embodiment.
Figure 9:
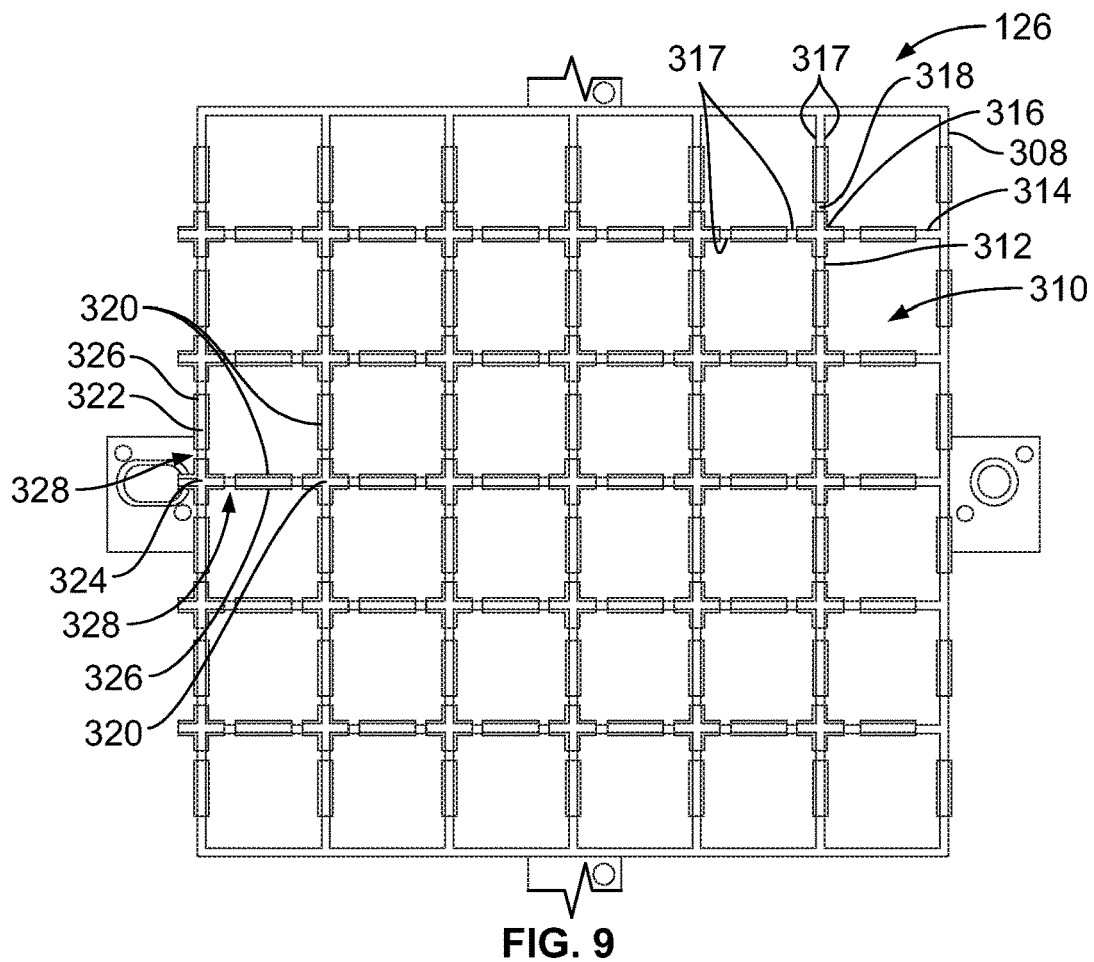
FIG. 9 is a bottom view of the press tool in accordance with an exemplary embodiment.
Figure 10:
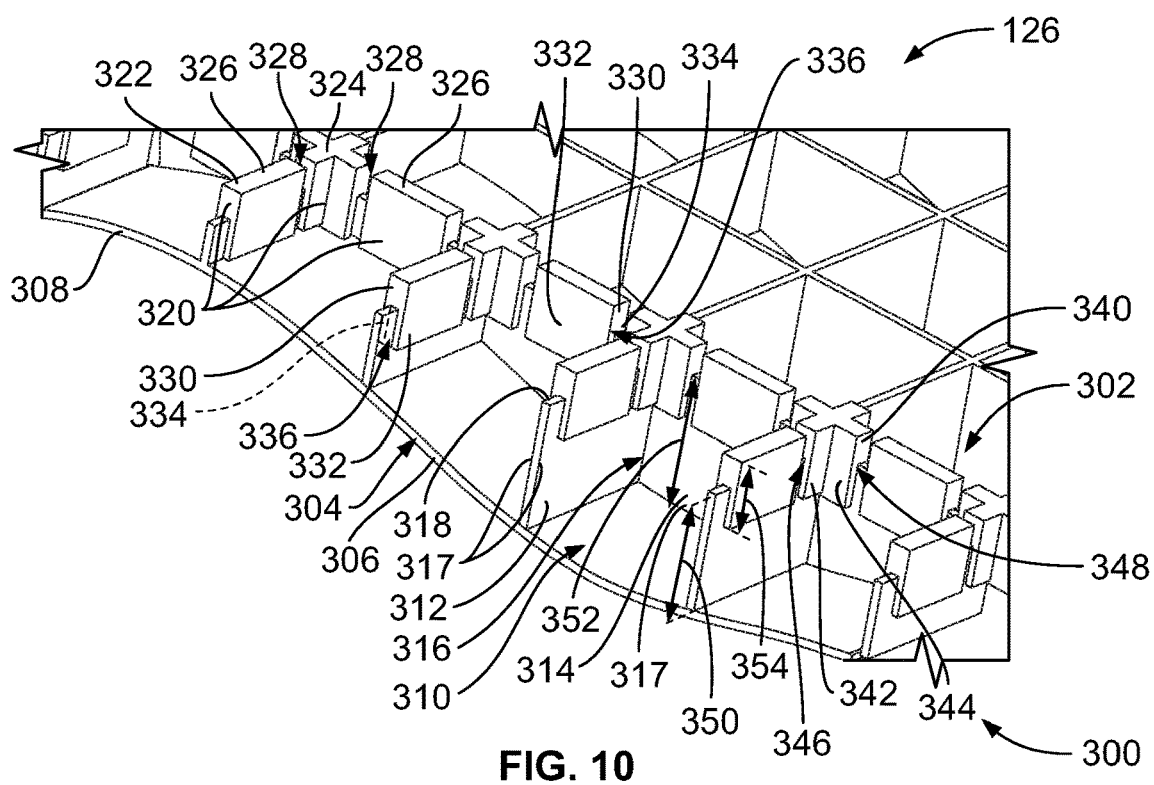
FIG. 10 is a partial sectional view of the press tool in accordance with an exemplary embodiment.

FIG. 8 is a bottom perspective view of the lower press tool 126 in accordance with an exemplary embodiment. FIG. 9 is a bottom view of the lower press tool 126 in accordance with an exemplary embodiment. FIG. 10 is a partial sectional view of the lower press tool 126 in accordance with an exemplary embodiment. The lower press tool 126 may be similar in structure to the upper press tool 124 (shown in FIG. 2) and elements and description relating to the lower press tool 126 may be equally applicable to the upper press tool 124.

The press tool 126 extends between an interior side 300 at the top and an exterior side 302 at the bottom. The interior side 300 is configured to face the upper press tool 124. The exterior side 302 is configured to face the lower frame 140 (shown in FIG. 2). In an exemplary embodiment, the press tool 126 includes an additive manufactured body 308 including a plurality of stacked layers of additive manufacturable material. The stacked layers of additive manufacturable material extend between the interior side 300 and the exterior side 302. In various embodiments, the additive manufactured body 308 is manufactured from a plastic material, such as a thermoplastic polymer material, thermoset polymer material, or another polymer material. For example, the additive manufactured body 308 may be manufactured from an Acrylonitrile-Butadiene-Styrene (ABS) material, such as a carbon filled ABS material. The layers of additive manufacturable material are applied or built-up using an additive manufacturing process, such as fused filament fabrication (FFF), plastic jet printing (PJP), 3-D printing, powder bed processing, selective heat sintering (SHS), and the like. Additive manufacturing of the press tool 126 may significantly reduce the fabrication cost and lead-time for fabrication as compared to metal plate type support tools. Additionally, the additive manufactured press tool 126 is significantly lighter weight than metal plate type support tools. In other various embodiments, the additive manufactured body 308 is manufactured from a metal material in layers by an additive process.

The interior side 300 includes a forming wall 306 defining a part forming surface 304 having a surface profile for forming the part. The part forming surface 304 may cover the entire interior side 300. Alternatively, the part forming surface 304 may be defined along only a portion of the interior side 300, such as near a center of the interior side 300. The size and shape of the part forming surface 304 corresponds with the desired size and shape of the part. In an exemplary embodiment, the part forming surface 304 is nonplanar. For example, the part forming surface 304 may be contoured, such as to define the shape of the part. Optionally, the interior side 300 may include one or more seals for sealing against the part and/or the press tool 126. Optionally, the interior side 300 may include one or more ports, such as for injecting material to the part forming surface 304 for forming the part.

The press tool 126 includes a plurality of hollow cores 310 at the exterior side 302. The hollow cores 310 are defined by longitudinal walls 312 and lateral walls 314 meeting at joints 316. The longitudinal walls 312 and lateral walls 314 form a pixelated grid or array of the cores 310. The cores 310 reduce the weight of the press tool 126 per thickness of the press tool 126. The longitudinal walls 312 and lateral walls 314 provide structural rigidity to the forming wall 306. The longitudinal walls 312 and lateral walls 314 spread the pressing load longitudinally and laterally across the forming wall 306.

The longitudinal walls 312 and the lateral walls 314 are perpendicular to each other such that the joints 316 are right angle joints. The longitudinal walls 312 and lateral walls 314 have opposite surfaces 317 that extend generally vertically between the interior side 300 and the exterior side 302. For example, the longitudinal walls 312 and the lateral walls 314 extend between the forming wall 306 at the top and exterior edges 318 at the bottom. The surfaces 317 face the hollow cores 310.

In an exemplary embodiment, the press tool 126 includes one or more press inserts 320 coupled to the longitudinal walls 312 and the lateral walls 314 at the exterior side 302. The press inserts 320 are manufactured from a material having a higher mechanical strength than the additive manufacturable material of the additive manufactured body 308. For example, in various embodiments, the press inserts 320 are manufactured from a metal material. The press inserts 320 are configured to be pressed inward by the pressing load from the lower frame 140 during the pressing operation for forming the part. For example, the lower frame 130 may press against abutment surfaces 322 of the press inserts 320 rather than directly against the longitudinal walls 312 and the lateral walls 314. The press inserts 320 distribute the pressing load along the longitudinal walls 312 and the lateral walls 314. The press inserts 320 provide structural support for the longitudinal walls 312 and the lateral walls 314, such as by increasing the mechanical strength of the longitudinal walls 312 and the lateral walls 314. The press inserts 320 provide structural support at the joints 316 and between the joints 316.

Optionally, the press inserts 320 are manufactured from a material having a higher thermal conductivity than the additive manufacturable material of the longitudinal walls 312 and the lateral walls 314. The press inserts 320 are thermally coupled to the longitudinal walls 312 and the lateral walls 314 to dissipate heating and/or cooling between the hollowed cores 310 and the walls 312, 314, such as to promote thermal transfer to the forming wall 306.

In an exemplary embodiment, the press inserts 320 are coupled to the longitudinal walls 312 and the lateral walls 314 after the press tool 126 is additive manufactured. For example, the press inserts 320 may be coupled to the exterior edges 318. In other various embodiments, the additive manufactured body 308 may be built up on/in/around the press inserts 320.

In the illustrated embodiment, the press tool 126 includes a plurality of discrete press inserts 320. For example, the press tool 126 includes corner sections 324 and linear sections 326. The corner sections 324 are provided at the joints 316. The linear sections 326 are provided along the longitudinal walls 312 and the lateral walls 314 between the joints 316. In the illustrated embodiment, the corner sections 324 and the linear sections 326 are separate and discrete sections with gaps 328 therebetween. The corner sections 324 and the linear sections 326 are manufactured separately. Optionally, the linear sections 326 may have different lengths to accommodate different length longitudinal walls 312 and lateral walls 314 between the joints 316. In other various embodiments, the corner sections 324 and the linear sections 326 may be coupled to the press tool 126 without the gaps 328. For example, the linear sections 326 may abut against the corner sections 324. In other various embodiments, the corner sections 324 and the linear sections 326 are integral and continuous to cover multiple longitudinal walls 312 and/or multiple lateral walls 314 with a single unitary press insert 320.

Each linear sections 326 includes a base 330, a first side wall 332 extending from the base 330 and a second side wall 334 extending from the base 330. A channel 336 is defined between the side walls 332, 334. The channel 336 receives the corresponding longitudinal wall 312 or lateral wall 314. Optionally, when the press insert 320 defining the linear section 326 is coupled to the longitudinal wall 312 or the lateral wall 314, the base 330 abuts against the exterior edge 318 of the corresponding longitudinal wall 312 or lateral wall 314. The pressing load may be transferred through the base 330 into the corresponding longitudinal wall 312 or lateral wall 314. The first side wall 332 extends along the corresponding surface 317 at a first side of the longitudinal wall 312 or lateral wall 314. The second side wall 334 extends along the corresponding surface 317 at a second side of the longitudinal wall 312 or lateral wall 314. In an exemplary embodiment, the sidewalls 332, 334 abut against the corresponding surfaces 317 such that the longitudinal wall 312 or the lateral wall 314 has a tight fit or interference fit in the channel 336. The interference fit distributes the pressing load into the longitudinal wall 312 or the lateral wall 314. In an exemplary embodiment, the sidewalls 332, 334 are thermally coupled to the surfaces 317 to transfer thermal loads between the press insert 320 and the longitudinal wall 312 or the lateral wall 314.

Each linear section 326 includes a base 340, longitudinal side walls 342, extending from the base 340 and lateral side walls 344 extending from the base 340. A longitudinal channel 346 is defined between the longitudinal side walls 342 and a lateral channel 348 is defined between the lateral side walls 344. The channels 346, 348 are perpendicular to each other defining a right angle channel that receives the corresponding joint 316. The channels 346, 348 may be at other orientations in alternative embodiments to accommodate non-orthogonal walls 312, 314. The longitudinal channel 346 receives the corresponding longitudinal walls 312 at the joint 316 and the lateral channel 348 receives the corresponding lateral walls 314 at the joint 316. Optionally, when the press insert 320 defining the corner section 324 is coupled to the longitudinal walls 312 and the lateral walls 314, the base 340 abuts against the exterior edges 318 of the corresponding walls 312, 314. The pressing load may be transferred through the base 340 into the walls 312, 314. The longitudinal side walls 342 extend along the corresponding surfaces 317 of the longitudinal walls 312. The lateral side walls 344 extend along the corresponding surfaces 317 of the lateral walls 314. In an exemplary embodiment, the sidewalls 342, 344 abut against the corresponding surfaces 317 such that the longitudinal walls 312 and the lateral walls 314 have a tight fit or interference fit in the channels 346, 348. The interference fit distributes the pressing load into the walls 312, 314. In an exemplary embodiment, the sidewalls 342, 344 are thermally coupled to the surfaces 317 to transfer thermal loads between the press insert 320 and the walls 312, 314.

Each longitudinal wall 312 has a height 350 and each lateral wall 314 has a height 352 measured between the forming wall 306 and the corresponding exterior edge 318. In various embodiments, the exterior edges 318 may be coplanar while the forming wall 306 is nonplanar, such as due to the contouring of the part forming surface 304. As such, various longitudinal walls 312 have different heights 350 and various lateral walls 314 have different heights 352. The heights 350, 352 may vary along the corresponding walls 312, 314. Each press insert 320 has a height 354 measured between the abutment surface 322 and the distal edge of the press insert 320. In various embodiments, as in the illustrated embodiment, the height 354 may be the same for each of the press insert 320 such that the distal edges of the press inserts 320 are at different distances from the forming wall 306. Alternatively, the press inserts 320 may have different heights 354 to accommodate the different heights 350, 352 of the walls 312, 314, such as to locate the distal edges of the press inserts 320 proximate to the forming wall 306.

Figure 11:
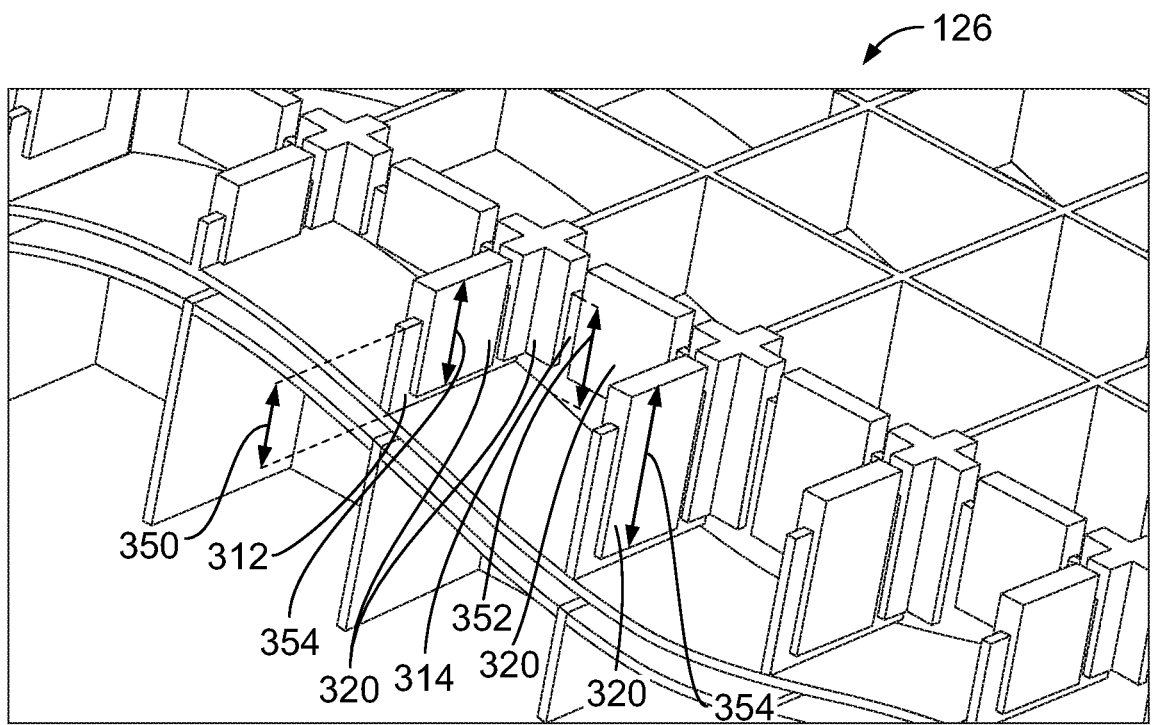
FIG. 11 is a partial sectional view of the press tool in accordance with an exemplary embodiment.

FIG. 11 is a partial sectional view of the lower press tool 126 in accordance with an exemplary embodiment. FIG. 11 illustrates the press inserts 320 with different heights 354. For example, taller press inserts 320 are used on taller walls 312, 314 and shorter press inserts 320 are used on shorter walls 312, 314. In the illustrated embodiment, the press inserts 320 extend along a majority of the height 350, 352 of each of the walls 312, 314 to provide mechanical stability along the majority of the height 350, 352 of each of the walls 312, 314.

Figure 12:
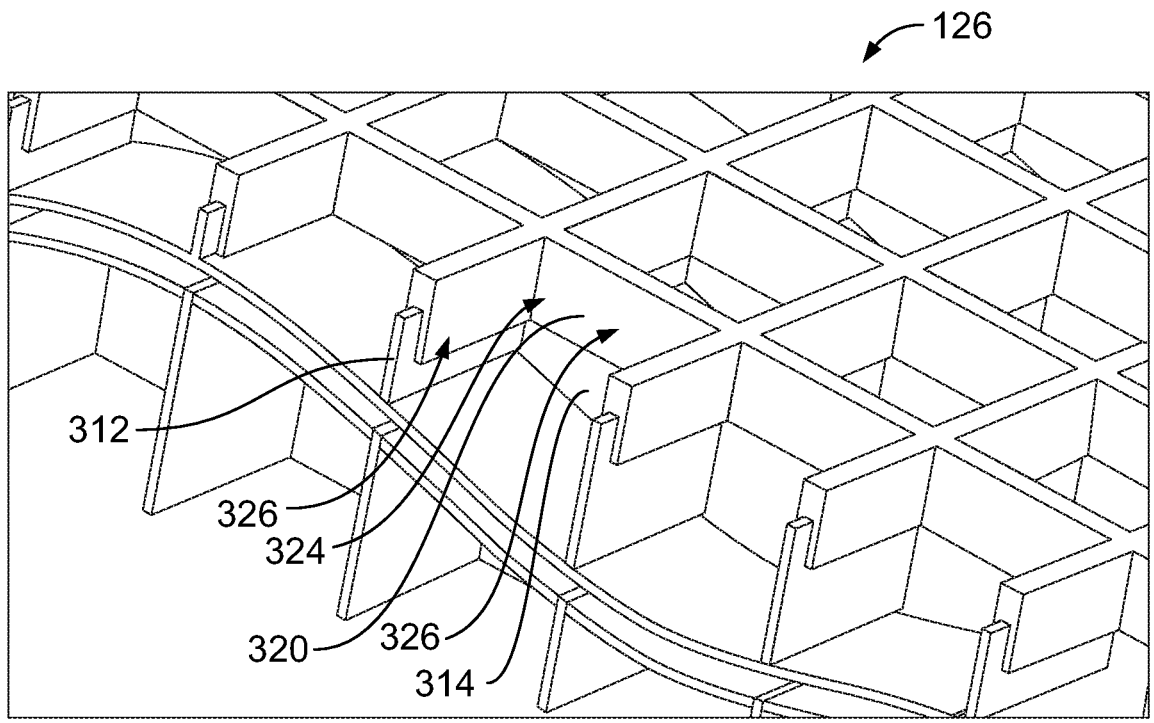
FIG. 12 is a partial sectional view of the press tool in accordance with an exemplary embodiment.

FIG. 12 is a partial sectional view of the lower press tool 126 in accordance with an exemplary embodiment. FIG. 12 illustrates the press inserts 320 being integral. The corner sections 324 and the linear sections 326 are integral with each other forming continuous press inserts 320 spanning multiple longitudinal walls 312 and multiple lateral walls 314. The integral press inserts 320 provide greater mechanical stability for the press tool 126 as compared to the discrete press insert pieces of the embodiment of FIG. 10. However, the discrete press insert pieces may be less expensive to manufacture. For example, the integral press insert 320 and the press tool 126 may be designed to be manufactured with tighter tolerances, while the discrete press insert pieces are modular in design and can accommodate various layouts of the longitudinal walls 312 and the lateral walls 314.

Figure 13:
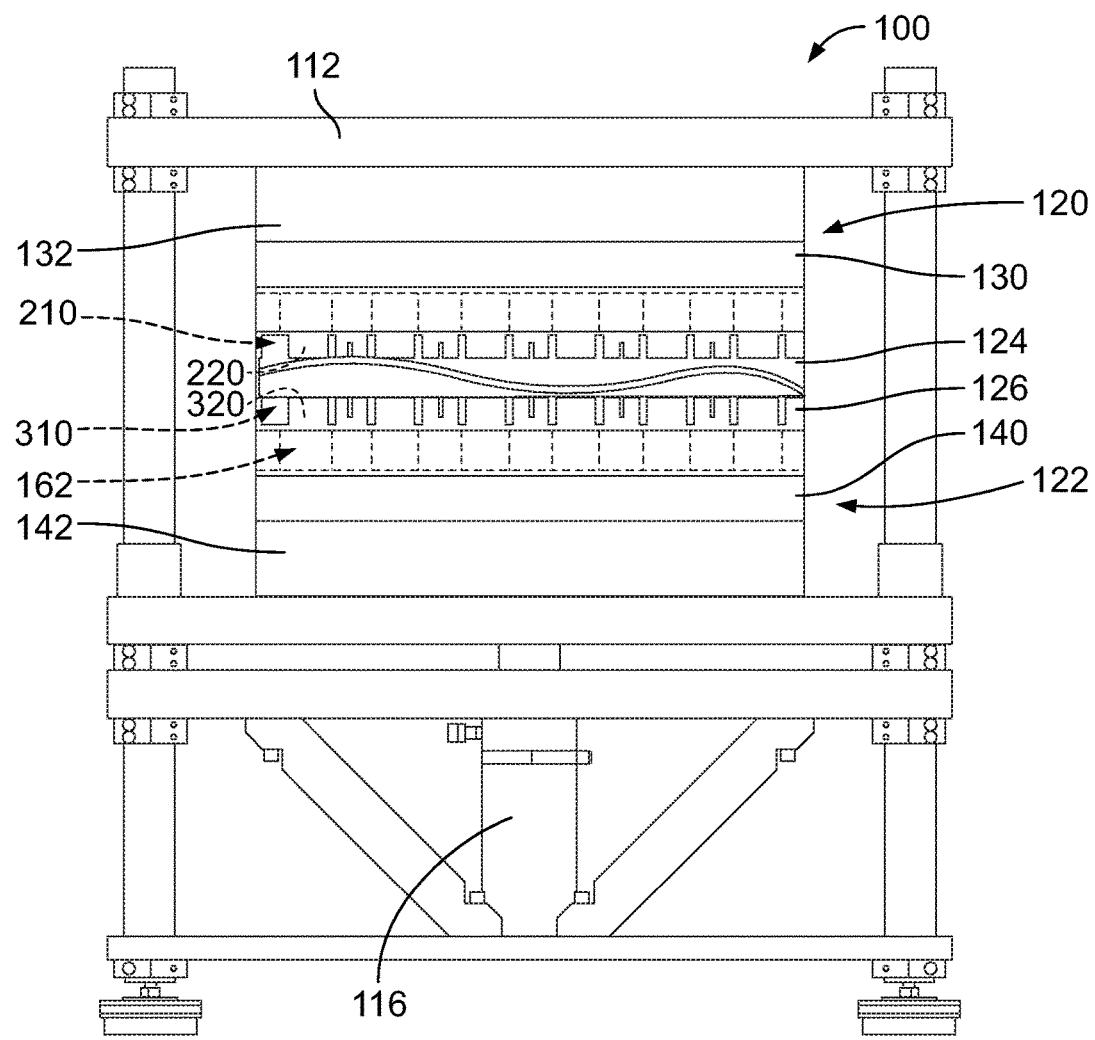
FIG. 13 is a side view of the forming machine in accordance with an exemplary embodiment.

FIG. 13 is a side view of the forming machine 100 in accordance with an exemplary embodiment. The upper press assembly 120 and the lower press assembly 122 are used to form the part therebetween. The press tools 124, 126 are aligned and pressed together by the pressing device 116. When the pressing device 116 is operated, the pressing load is transferred from the upper frame 130, which is held fixed by the upper plate 112, to the upper press tool 124 and the pressing load is transferred from the lower frame 140 to the lower press tool 126. The pressing load is transferred from the upper frame 130 to the press inserts 220 on the upper press tool 124. The press inserts 220 distribute the pressing load into the upper press tool 124. The pressing load is transferred from the lower frame 140 to the press inserts 320 on the lower press tool 126. The press inserts 320 distribute the pressing load into the lower press tool 126.

In an exemplary embodiment, the upper thermal unit 132 is operated to provide a thermal load to the upper press tool 124, and thus the part. The lower thermal unit 142 is operated to provide a thermal load to the lower press tool 126, and thus the part. For example, the thermal units 132, 142 provide heating and/or cooling for the part. Optionally, the thermal units 132, 142 provide heating using hot air circulated through the hollow cores 162 (shown in phantom) in the frames 130, 140 and the hollow cores 210, 310 (shown in phantom) in the press tools 124, 126. Optionally, the thermal units 132, 142 provide cooling using cool air circulated through the hollow cores 162 in the frames 130, 140 and the hollow cores 210, 310 in the press tools 124, 126. Because the hollow cores 210, 310 and the press tools 124, 126 are aligned with corresponding hollow cores 162 in the frames 130, 140, the thermal load may be transferred between the frames 130, 140 and the press tools 124, 126. The hollow cores 162, 210, 310 are pixelated and separated from each other to allow targeted heating and/or cooling. For example, different cores 162, 210, 310 can be heated or cooled differently than surrounding cores 162, 210, 310 to control heating of the part during the pressing operation. The press inserts 220, 320 are thermally coupled to the walls 212, 214, 312, 314 of the press tools 124, 126 to promote thermal transfer between the additive manufactured bodies of the press tools 124, 126 and the air circulated through the hollow cores 210, 310. The press inserts 220, 320 thus promote thermal transfer between the air and the part.

Figure 14:
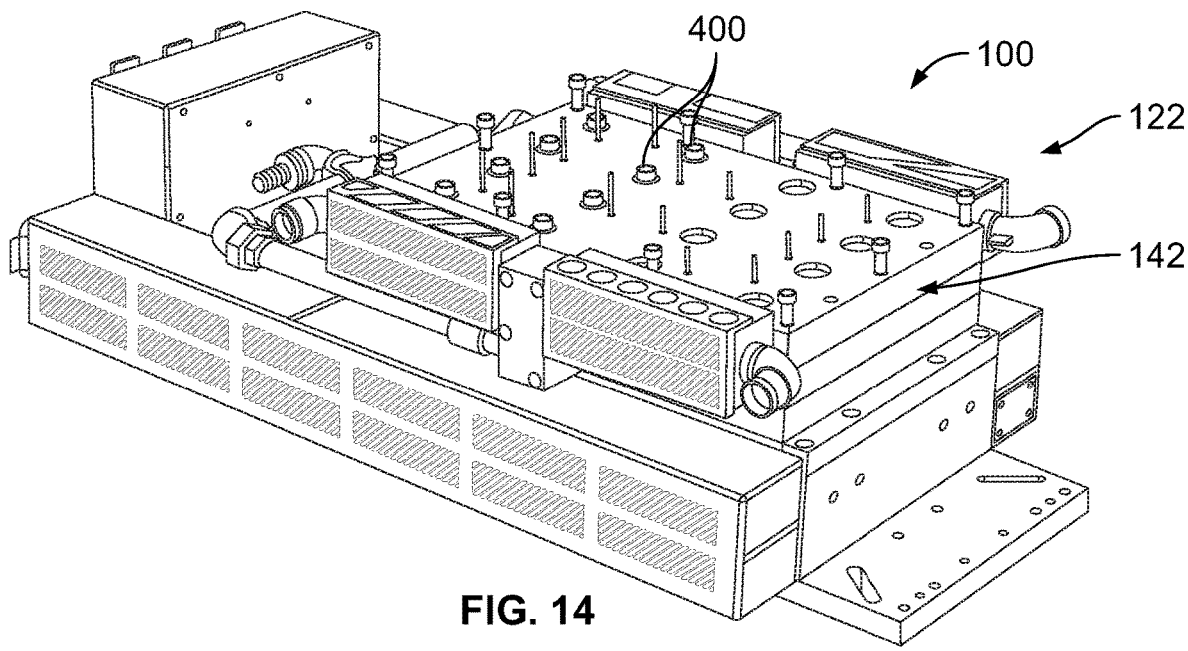
FIG. 14 illustrates a portion of the forming machine showing the press assembly.

FIG. 14 illustrates a portion of the forming machine 100 showing the lower press assembly 122 without the lower press tool 126 or the lower frame 140. FIG. 14 illustrates the lower thermal unit 142 showing thermal generators 400 for generating thermal loads. For example, the thermal generators 400 are used to generate heating and/or cooling. The thermal generators 400 may include air ducts for circulating air to the lower press assembly 122. For example, the thermal generators 400 may include supply duct and return ducts to circulate air through the lower frame 140 and the lower press tool 126. Multiple thermal generators 400 are provided to provide targeted heating and/or cooling. For example, each thermal generator 400 may be configured to supply heating and/or cooling to a corresponding core 162 and the lower frame 140 and thus the corresponding core 310 in the lower press tool 126. The thermal generators 400 may be individually operated, such as for operation at different temperatures.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A press tool for forming a part, the press tool comprising:
   an additive manufactured body comprising a plurality of stacked layers of additive manufactured material extending between an interior side and an exterior side, the interior side having a part forming surface including a surface profile for forming the part, the exterior side having a plurality of hollow cores defined by longitudinal walls and lateral walls meeting at joints; and
   press inserts separate and discrete from the additive manufactured body, the press inserts being coupled to the longitudinal walls and the lateral walls at the exterior side, the press inserts including channels receiving corresponding longitudinal walls and lateral walls, the press inserts configured to be pressed inward by a pressing load during a pressing operation for forming the part, the press inserts distributing the pressing load along the longitudinal walls and the lateral walls.

2. The press tool of claim 1, wherein the press inserts are manufactured from a material having higher mechanical strength than the additive manufactured material of the additive manufactured body.

3. The press tool of claim 1, wherein the additive manufactured body is manufactured from plastic material, the press inserts being manufactured from a metal material.

4. The press tool of claim 1, wherein the layers of the additive manufactured body are built up by an additive manufacturing process.

5. The press tool of claim 1, wherein the longitudinal walls are perpendicular to the lateral walls.

6. The press tool of claim 1, wherein the press inserts are provided at the joints.

7. The press tool of claim 1, wherein the press inserts include longitudinal sections and lateral sections that are integral extending along both the longitudinal walls and the lateral walls.

8. The press tool of claim 1, wherein the press inserts provide structural support for the longitudinal walls and the lateral walls.

9. The press tool of claim 1, wherein each press insert includes a base, a first side wall extending from the base and a second side wall extending from the base with the channel defined between the first and second side walls, the first side wall extending along a first side of the corresponding longitudinal wall or lateral wall, the second side wall extending along a second side of the corresponding longitudinal wall or lateral wall.

10. The press tool of claim 1, wherein the press inserts are thermally coupled to the corresponding longitudinal walls and lateral walls, the material of the press inserts having a higher thermal conductivity than the additive manufactured material of the longitudinal walls and the lateral walls.

11. The press tool of claim 1, wherein the hollow cores are configured to receive a thermal load, the press inserts defining heat sinks transferring the thermal loads into the corresponding longitudinal walls and lateral walls.

12. The press tool of claim 1, wherein the additive manufactured body includes a forming wall at the interior side, the longitudinal walls and the lateral walls extending from exterior edges to the forming wall, the press inserts being mounted to the exterior edges, the press inserts extending a majority of a height of the corresponding longitudinal walls and lateral walls between the exterior edges and the forming wall.

13. The press tool of claim 12, wherein the forming wall is nonplanar, the exterior edges being coplanar, the longitudinal walls and lateral walls having different heights between the exterior edges and the forming wall.

14. The press tool of claim 13, wherein the press inserts have different heights.

15. The press tool of claim 1, wherein the press inserts comprise corner sections and linear sections, the corner sections comprising right angle channels receiving corresponding joints, the linear sections comprising channels receiving the corresponding longitudinal walls or lateral walls.

16. The press tool of claim 15, wherein the corner sections are separate and discrete from the linear sections with gaps therebetween.

17. The press tool of claim 15, wherein the corner sections are integral with corresponding linear sections.

18. A press assembly for forming a part, the press assembly comprising:
   a frame including a press surface for generating a pressing load and a thermal unit for generating a thermal load configured for at least one of heating or cooling;
   a press tool coupled to the frame and engaging the press surface, the press tool having an additive manufactured body comprising a plurality of stacked layers of additive manufactured material extending between an interior side and an exterior side, the interior side having a part forming surface including a surface profile for forming a part, the exterior side having a plurality of hollow cores defined by longitudinal walls and lateral walls meeting at joints, the hollow cores being in thermal communication with the thermal unit for receiving the thermal load, the press tool having press inserts separate and discrete from the additive manufactured body, the press inserts being coupled to the longitudinal walls and the lateral walls at the exterior side, the press inserts including channels receiving corresponding longitudinal walls and lateral walls, the press inserts having abutment surfaces engaging the press surface of the frame and being pressed inward by the pressing load from the frame during a pressing operation for forming the part, the press inserts distributing the pressing load along the longitudinal and lateral walls.

19. The press assembly of claim 18, wherein thermal unit includes a plurality of thermal generators for generating the thermal load, each thermal generator being associated with a corresponding hollow core for supplying the thermal load to the hollow core.

20. The press assembly of claim 18, wherein the frame includes a locating element and the press tool includes a locating element coupled to the locating element of the frame to position the press tool relative to the frame.

21. The press assembly of claim 18, wherein the abutment surfaces of the press inserts are coplanar to engage the frame.

22. The press assembly of claim 18, wherein the frame is a lower frame and the press tool is a lower press tool, the press assembly further comprising an upper frame and an upper press tool coupled to the upper frame, the lower frame and lower press tool being movable relative to the upper frame and the upper press tool during the pressing operation, the upper press tool having an additive manufactured body comprising a plurality of stacked layers of additive manufactured material extending between an interior side and an exterior side, the interior side having a part forming surface facing the part forming surface of the lower press tool, the exterior side having a plurality of hollow cores defined by longitudinal walls and lateral walls meeting at joints, the upper press tool having press inserts coupled to the longitudinal walls and the lateral walls at the exterior side engaging the upper frame, the press inserts distributing a pressing load from the upper frame along the longitudinal and lateral walls.

23. The press assembly of claim 18, wherein each press insert includes a base, a first side wall extending from the base and a second side wall extending from the base with the channel defined between the first and second side walls, the first side wall extending along a first side of the corresponding longitudinal wall or lateral wall, the second side wall extending along a second side of the corresponding longitudinal wall or lateral wall.

24. A method of forming a part comprising:
providing a press tool having an additive manufactured body comprising a plurality of layers extending between an interior side and an exterior side, the interior side having a part forming surface including a surface profile for forming the part, the exterior side having a plurality of hollow cores defined by longitudinal walls and lateral walls meeting at joints;
coupling one or more press inserts to the longitudinal walls and the lateral walls at the exterior side, the press inserts including channels receiving corresponding longitudinal walls and lateral walls;
loading the press tool with the press inserts into a frame of a press assembly; and
pressing the frame inward during a pressing operation to impart a pressing load against the press inserts, the press inserts distributing the pressing load along the longitudinal and lateral walls to form the part against the surface profile.

25. The method of claim 24, further comprising imparting a thermal load at the exterior side of the press tool into the hollow cores and thermally transferring the thermal load by the press inserts into the longitudinal walls and the lateral walls.

\* \* \* \* \*